May 16, 1950        H. A. CLARK        2,507,516
ORGANOSILOXANES
Filed March 19, 1949
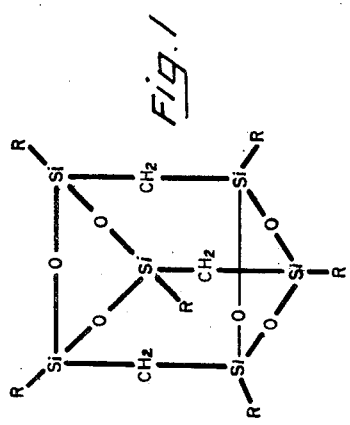
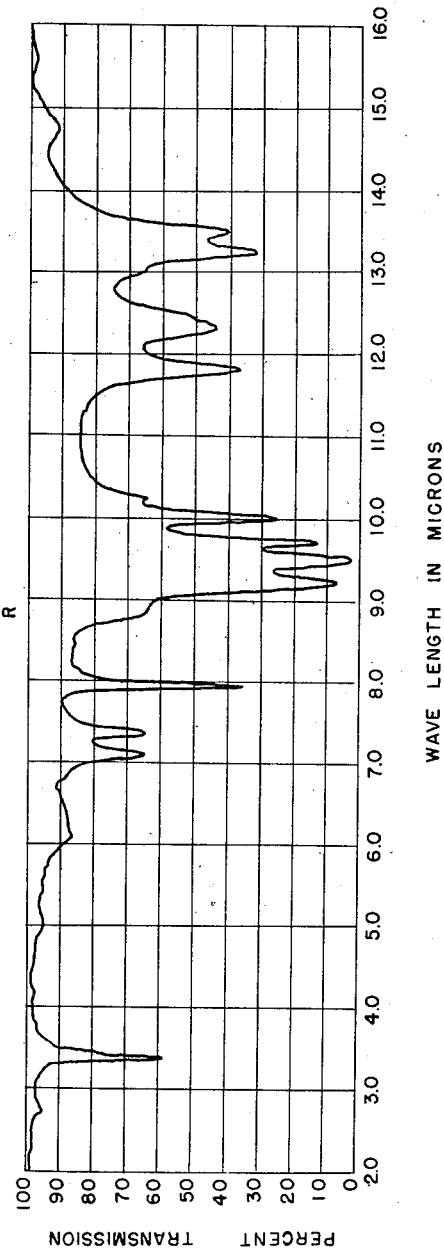
INVENTOR.
HAROLD A. CLARK
BY Patented May 16, 1950

2,507,516

UNITED STATES PATENT OFFICE 2,507,516

ORGANOSILOXANES

Harold A. Clark, Midland, Mich., assignor to Dow Corning Corporation, Midland, Mich., a corporation of Michigan Application March 19, 1949, Serial No. 82,415

10 Claims. (Cl. 260—46.5)

The present invention relates to new organosilicon compositions and their production.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The present application is concerned with compositions which contain both siloxane and methylene linkages.

In accordance with the present invention, these new organosilicon compositions are produced by hydrolyzing compounds of the type

in which each R represents a radical of the group consisting of alkyl and monocyclic aryl radicals and each X represents a halogen atom.

The compositions of the present invention have the general formula

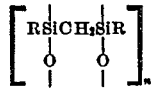

where $n$ is an integer having a value of at least 3 and each R is a hydrocarbon radical of the group consisting of alkyl radicals, such as methyl to octadecyl, and monocyclic aryl radicals, such as phenyl, tolyl and xylyl. Where $n$ has a value of three, the composition produced is cyclic and of a crystalline nature. The general formula of this crystalline composition is shown in Fig. 1 of the accompanying drawing which is a diagrammatic illustration of bond arrangements within the crystalline composition hereof. The drawing does not purport to show the spatial geometry of the composition. Fig. 2 is an infrared spectrograph of the compound of this type in which R is methyl. Where $n$ has a value of greater than 3, resinous materials are obtained. In these resins $n$ has an undeterminable high value since these are high polymers.

The reactant in the case of

may be prepared by reacting $CH_3Cl_2SiCH_2SiCl_3$ with methyl Grignard reagent in amount sufficient to replace one of the chlorines with a methyl radical.

After the preparation of the reactant

it may be diluted with ether, hydrolyzed and condensed. Two layers are formed, one aqueous and the other an ether solution of the hydrolyzate. A deposit of crystals is separated from the ether solution. This may be removed by filtration. The balance of the hydrolyzate is removed by evaporation to form a varnish type of product. Alternatively the ether may be removed without adding any other solvent to produce a thermoplastic resin.

The identity of the compound

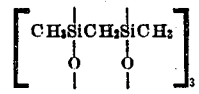

was proven by infrared spectroscopy. The method used is described in Wright and Hunter, J. A. C. S., vol. 69, page 803. In this method the spectrum of the solvent is compensated for so that no bands for the solvent appear. By the method of preparation it is known that the polymer units are

The infrared spectrograph is shown in the accompanying drawing.

In the range from 2 to 7.6 $\mu$, a solution of 100 milligrams of the compound in 10 cc. of carbon tetrachloride was employed. In the range from 7.6 to 14 $\mu$, a solution of 150 milligrams of the compound in 10 cc. of carbon disulfide was employed. A sample cell one mm. thick was used.

The lack of a band at 2.95 $\mu$ shows that there is no hydroxyl in the compound. Accordingly the compound is completely condensed. The bands at 3.4 and 7.9 $\mu$ are related to methyl radicals on silicon. That at 7.1 $\mu$ shows hydrogen on carbon. The bands at 7.4 and 9.5 $\mu$ show methylene radicals bonded to two silicon atoms. That at 9.2 $\mu$ shows the cyclic structure

The 9.7 $\mu$ band shows the cyclic structure $(SiO)_3$. The bands from 11.6 to 14 $\mu$ are produced by the stretch vibration of Si—C bonds.

The only compound which can correspond to these bands and be formed from the polymer units is that shown in the drawing.

The crystalline products of the present invention are useful for copolymerizing with other siloxanes for the preparation of stable fluids for heat transfer. The resinous products of the present invention may be used in formulating heat and weather resistant coatings for boilers, stacks, ovens, and other hot metal surfaces.

The following examples illustrate the method of the present application.

*Example 1*

Fifty parts by weight of 2,2,4,4 tetrachloro-2,4 disilapentane, $Cl_2CH_3SiCH_2SiCH_3Cl_2$, was diluted with 99.6 parts of ethyl ether and the solution poured onto cracked ice. The ether hydrolyzate solution after a time started depositing crystals of

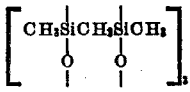

which were separated by filtration. More of this crystallized upon concentrating the solution. The residue was a resinous material, which is useful as a varnish.

The crystalline product sublimed at 175° C. It was very soluble, in ether, acetone, ethanol, and butanol. The freezing point of the sublimed material is 199° C.

*Example 2*

10 parts by weight of $C_6H_5Cl_2SiCH_2SiCl_2CH_3$ was diluted with 35.7 parts of ethyl ether and poured over cracked ice. The organic layer was separated, and was neutralized with $NaHCO_3$. The ethyl ether solution was concentrated by evaporation of the ether resulting in a thermoplastic resin.

When $C_6H_5Cl_2SiCH_2SiCl_2C_6H_5$ is similarly hydrolyzed and condensed a resinous product is obtainable.

That which is claimed is:

1. Organosiloxane compositions having the formula

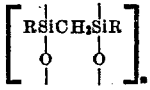

in which each R is a radical of the group consisting of alkyl and monocyclic aryl radicals and $n$ is a positive integer having a value of at least three.

2. Organosiloxane compositions having the formula

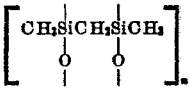

in which $n$ is a positive integer having a value of at least three.

3. Organosiloxane compositions having the formula

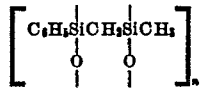

in which $n$ is a positive integer having a value of at least three.

4. Organosiloxane compositions having the formula

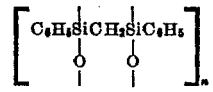

in which $n$ is a positive integer having a value of at least three.

5. Organosiloxane compositions having the formula

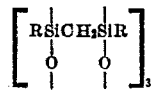

in which R is a radical of the group consisting of alkyl and monocyclic aryl radicals.

6. An organosiloxane composition having the formula

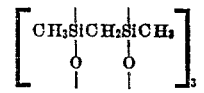

7. The method which comprises hydrolyzing a compound of the type $RX_2SiCH_2SiX_2R$ in which each R is a radical of the group consisting of alkyl and monocyclic aryl radicals and each X is a halogen atom, and condensing the hydrolyzate, whereby there is produced an organosiloxane composition of the type

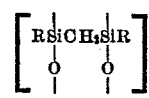

in which $n$ is a positive integer having a value of at least three.

8. The method in accordance with claim 7 in which all of the R's are methyl radicals.

9. The method in accordance with claim 7 in which some of the R's are methyl radicals and the remainder are phenyl radicals.

10. The method in accordance with claim 7 in which all of the R's are phenyl radicals.

HAROLD A. CLARK.

REFERENCES CITED

The following references are of record in the file of this patent:

UNITED STATES PATENTS

| Number | Name | Date |
|---|---|---|
| 2,352,974 | Rochow | July 4, 1944 |
| 2,381,000 | Patnode et al. | Aug. 7, 1945 |
| 2,467,858 | Sage | Apr. 19, 1949 |

OTHER REFERENCES

Bluestein: Journ. Amer. Chem. Soc., vol. 70, Sept. 1948, pp. 3068 to 3071.